United States Patent
Collins et al.

(10) Patent No.: US 7,258,516 B1
(45) Date of Patent: Aug. 21, 2007

(54) VEHICLE CARGO TRANSPORT APPARATUS FOR CARRYING AND SECURING A LOAD

(76) Inventors: Manuel Collins, 145 W. 35th St., Cut Off, LA (US) 70345; Derrick Prentice, 1300 Bayou Black Dr., Houma, LA (US) 70360; Carroll Diaz, 464 W. 47th St., Cut Off, LA (US) 70345

( * ) Notice: Subject to any disclaimer, the term of this patent is extended or adjusted under 35 U.S.C. 154(b) by 80 days.

(21) Appl. No.: 11/187,447

(22) Filed: Jul. 22, 2005

Related U.S. Application Data

(60) Provisional application No. 60/590,187, filed on Jul. 22, 2004.

(51) Int. Cl.
*B61D 45/00* (2006.01)

(52) U.S. Cl. ........................................ 410/99
(58) Field of Classification Search ............. None
See application file for complete search history.

(56) References Cited

U.S. PATENT DOCUMENTS

| | | | | |
|---|---|---|---|---|
| 2,372,967 A | * | 4/1945 | Martin | 410/97 |
| 3,774,364 A | * | 11/1973 | Johnson | 52/509 |
| 4,779,779 A | * | 10/1988 | Haugland | 224/328 |
| 5,050,924 A | * | 9/1991 | Hansen | 296/100.15 |
| 5,553,981 A | * | 9/1996 | Braden | 410/116 |
| 5,733,082 A | * | 3/1998 | Schrader | 410/115 |
| 5,772,369 A | * | 6/1998 | Lerman et al. | 410/96 |
| 6,048,145 A | * | 4/2000 | Pedersen | 410/100 |
| 6,048,146 A | * | 4/2000 | Wiedmeyer | 410/100 |

* cited by examiner

*Primary Examiner*—H Gutman
(74) *Attorney, Agent, or Firm*—Garvey, Smith, Nehrbass & North, L.L.C.; Charles C. Garvey, Jr.

(57) ABSTRACT

A vehicle cargo transport apparatus is disclosed that provides a vehicle having a cargo deck having a plurality of beams, the beams being preferably positioned flush with the cargo deck, each beam having one or more beam openings or sockets. There are preferably first and second pairs of the beams. The first pair is preferably a pair of parallel beams. The beams of the second pair are preferably parallel. At least two of the beams are generally perpendicular to one another. Eyebolt like connectors attach to the beam openings, preferably by interlocking a lower end portion of the connector with a beam at a beam opening or socket. Specially configured straps employ cables and foam core sleeves. The sleeves can be color coded to indicate the nature of the cargo.

24 Claims, 4 Drawing Sheets

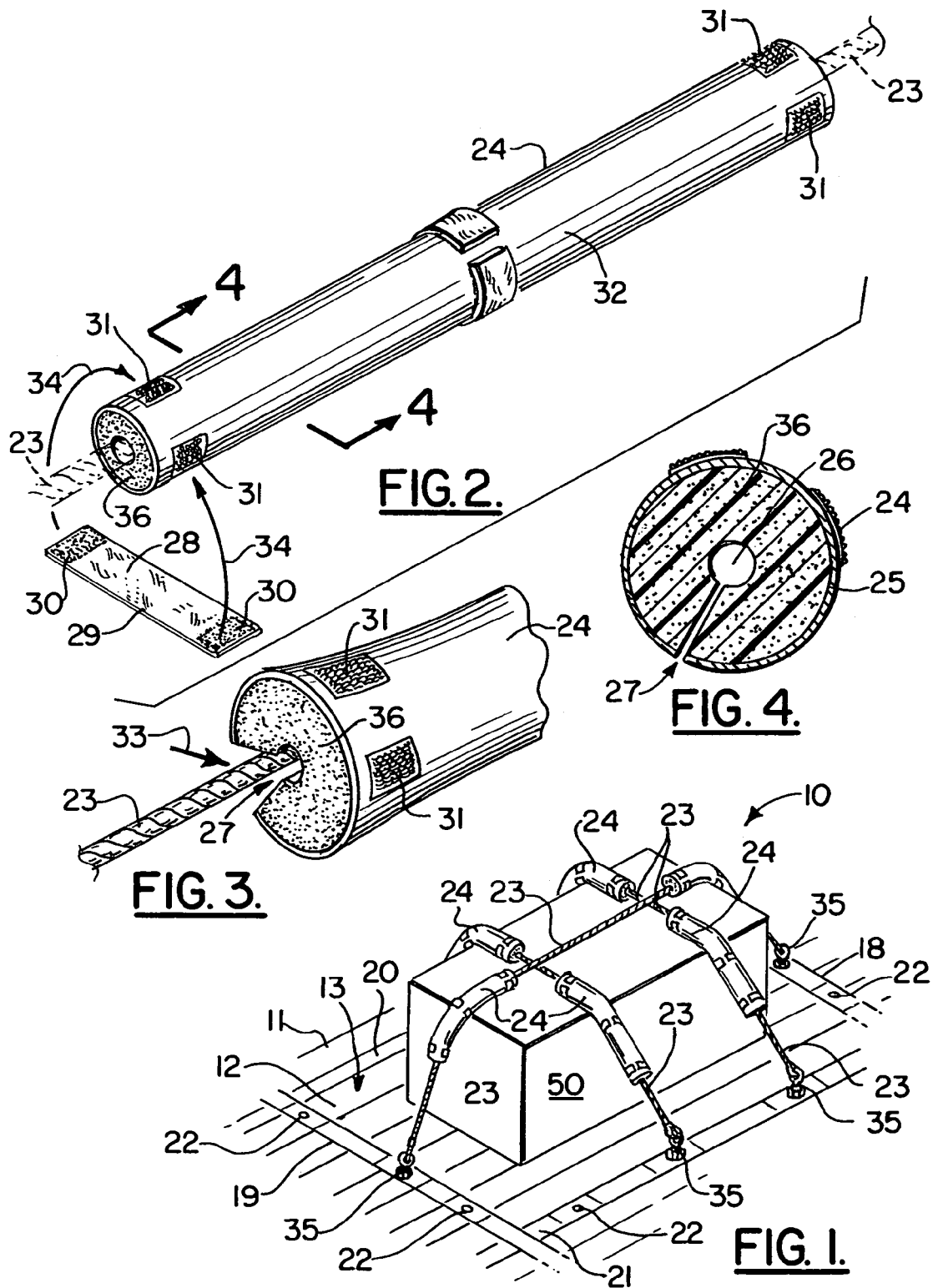

VEHICLE CARGO TRANSPORT APPARATUS FOR CARRYING AND SECURING A LOAD

CROSS-REFERENCE TO RELATED APPLICATIONS

Priority of U.S. Provisional Patent Application Ser. No. 60/590,187, filed Jul. 22, 2004, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to a vehicle cargo transport apparatus and method that can be used to carry and secure packages or loads on vehicles such as trucks, vessels, airplanes, rail cars and the like. Even more particularly, the present invention relates to an improved vehicle cargo transport apparatus and method for carrying and securing a load or package wherein a vehicle load platform provides a deck surface having first and second pairs of spaced apart, generally parallel beams having specially configured sockets that are receptive of eye bolts to which tie down straps can be fastened in a front-to-rear and in a side-to-side fashion, the location of the eye bolts being selected by the user so that the combination of tie down straps and eye bolts help secure the load in every direction including diagonally.

2. General Background

Vehicles such as trucks, vessels, airplanes and rail cars provide a load platform with an upper surface that carries large packages to and from selected destinations. Tie down straps are often used to secure a load to the upper surface of the load platform of the vehicle. In a marine environment, work boats carry loads to and from offshore locations such as oil well drilling and production platforms. In heavy seas, these loads are desirably restrained in multiple directions.

Truck and trailer rigs typically employ tie down straps that are positioned side-to-side, extending to the left and right sides of the vehicle load platform upper surface.

GENERAL DISCUSSION OF THE PRESENT INVENTION

The present invention provides an improved vehicle cargo transport apparatus for carrying and securing a load to a selected vehicle. The system includes a vehicle having a load platform with an upper surface preferably flush with the upper surface.

Beams are affixed to the load platform at the upper surface. A first pair of the beams forms an angle with a second pair of the beams. In the preferred embodiment, the first pair of beams are generally parallel and each forms an angle of about 90° with each beam of a second pair of beams. The second pair of beams are thus preferably generally parallel.

In one embodiment, a plurality of tie down anchors (preferably eye bolts) are selectively and removably attachable to spaced apart openings or sockets that are located at different positions along the beams. The anchors enable multiple load tie down straps to be selectively attached to the beams at the tie down anchors when securing the load.

A plurality of the tie down straps, slings, chains or the like are provided for securing the load to the platform, each strap or sling extending between a tie down anchor affixed to one beam and another tie down anchor on another beam.

The tie down anchors are provided with a proximal upper end portion and an expandable distal lower end portion. This lower end portion interlocks with the openings or sockets when the proximal portion of the anchor is rotated.

In the preferred embodiment, the anchor proximal end portion is an eyelet mounted on a shaft that can be rotated relative to the remaining portion of the tie down anchor.

The expandable portion of each tie down anchor includes a plurality of separate members that move between retracted and expanded positions.

The vehicle can be a marine vessel, a truck, an aircraft, an automobile, or a rail car.

The tie downs preferably include a strap or sling and a sleeve that is attached to the strap. The sleeve forms an interface between each strap and the load to be secured. The sleeve is preferably of a softer foam material (core) covered with a generally cylindrically shaped wall of a harder material that can be color coded to define the load being transported.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 1 is a perspective view of the preferred embodiment of the apparatus of the present invention;

FIG. 2 is a fragmentary perspective view of the preferred embodiment of the apparatus of the present invention;

FIG. 3 is another fragmentary perspective view of the preferred embodiment of the apparatus of the present invention;

FIG. 4 is a sectional view taken along lines 4-4 of FIG. 2;

DETAILED DESCRIPTION OF THE PREFERRED EMBODIMENT

Figure 5:
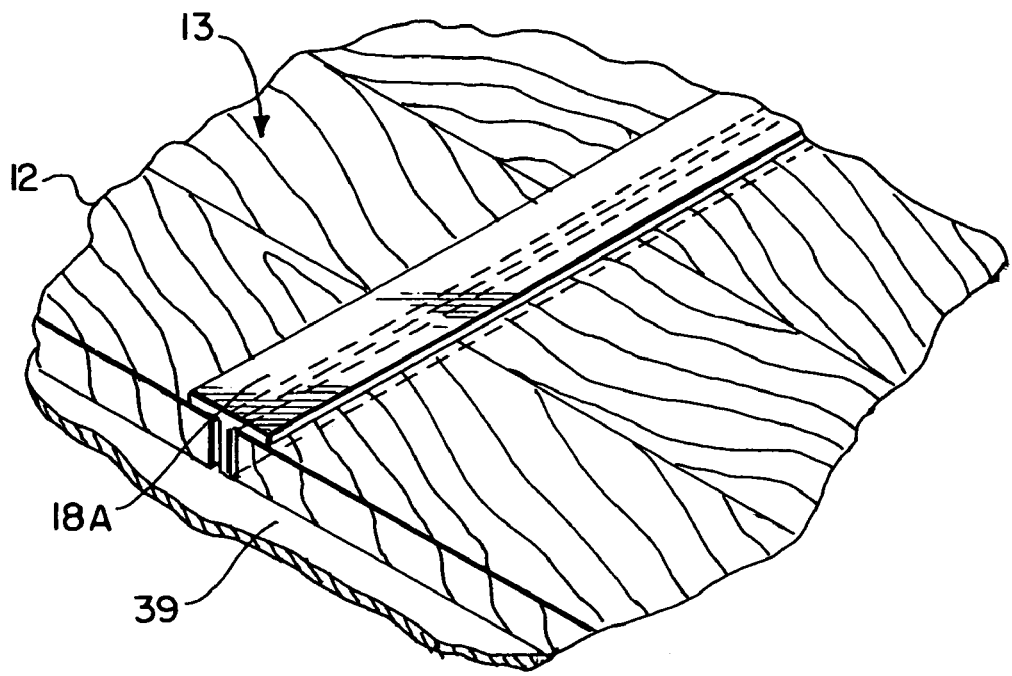
FIG. 5 is a partial perspective, fragmentary of the preferred embodiment of the apparatus of the present invention, illustrating the vehicle load platform upper surface and one of the metallic beams, prior to modification.

In FIG. 1, the present invention provides a vehicle cargo transport apparatus 10 that features specially configured securements for holding a package 50 to the load carrying surface 13 of a vehicle 11, restraining it from movement in numerous directions.

A vehicle 11 (e.g. marine vessel, truck, rail car, aircraft, wagon or the like) provides a vehicle platform 12 with an upper load carrying surface 13. In FIGS. 1 and 5-12, vehicle platform 12 upper surface 13 can be defined by a plurality of wooden, plastic or metallic members 14, 15, 16 or like structural supports. An underdeck 39 (e.g. steel plate) can be provided under the members 14, 15, 16. A groove 17 in platform 12 (see FIG. 9) carries each of a plurality of beams (e.g. 18, 18A). Preferably four or more beams 18, 19, 20, 21 are provided that surround a package 50 or other load to be transported. The plurality of beams can include front and rear transverse beams 18, 19 respectively. The plurality of beams can provide a second pair of beams, namely first and second longitudinal beams 20, 21.

In the preferred embodiment, the beams 18, 19 are parallel. In the preferred embodiment, the beams 20, 21 are parallel. Each of the beams of the first pair 18, 19 are generally perpendicular to each of the beams 20, 21 of the second pair.

Each of the beams 18, 19, 20, 21 is provided with a plurality of openings or sockets 22. Each socket 22 can be part of a new section of beam that replaces part of an existing beam. For example, in offshore work boats, some beams 18A are often existing beams that are provided in the vehicle platform 12 upper surface 13 as shown in FIG. 5. Alternatively, openings or sockets 22 can be selectively positioned in a metal deck.

Figure 6:
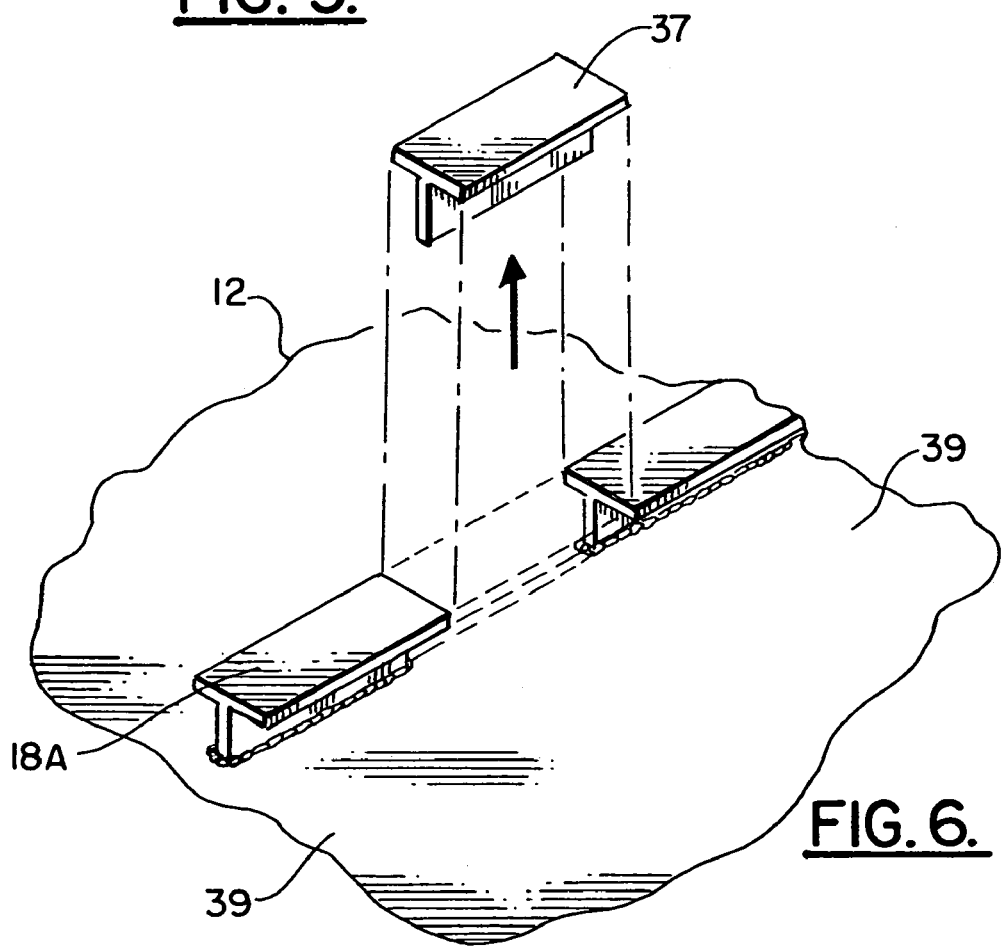
FIG. 6 is a partial perspective, fragmentary of the preferred embodiment of the apparatus of the present invention, illustrating the vehicle load platform upper surface and one of the metallic beams, prior to modification.
Figure 7:
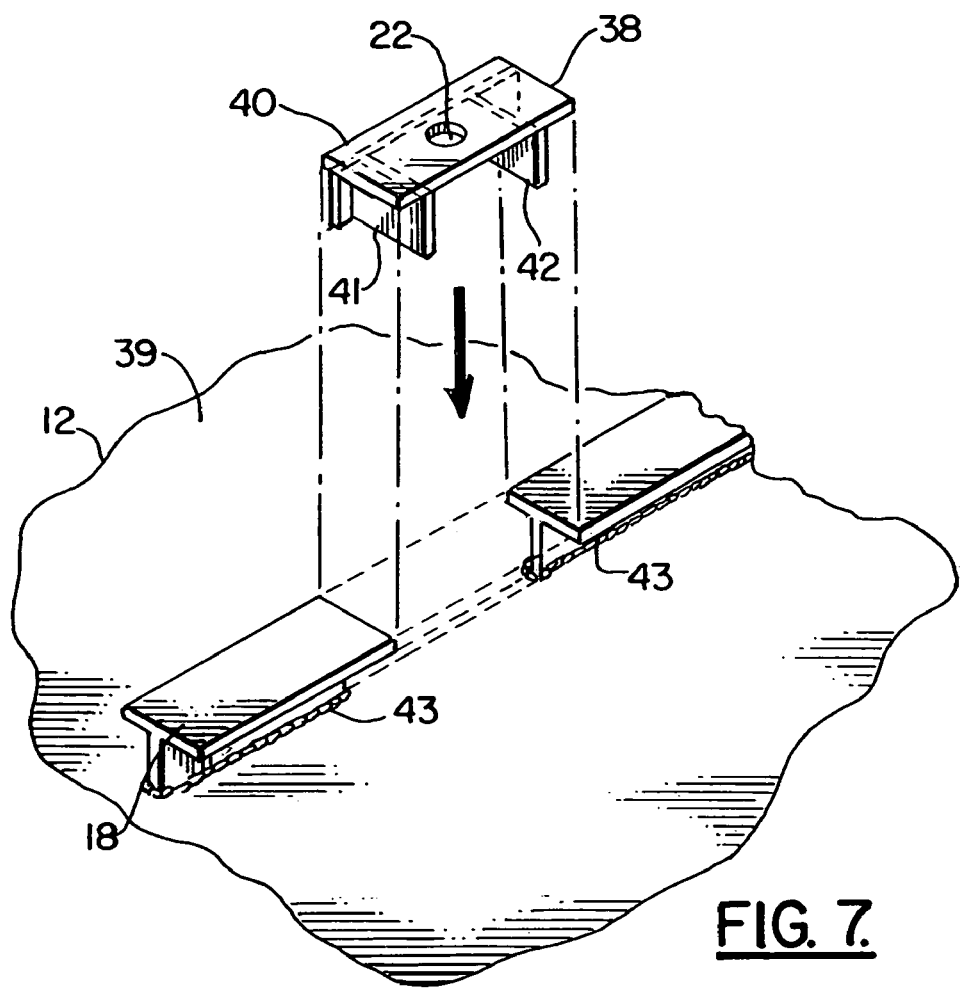
FIG. 7 is a partial perspective view of the preferred embodiment of the apparatus of the present invention showing insertion of a new section having a socket for one of the beams attached to the vehicle load platform upper surface.
Figure 8:
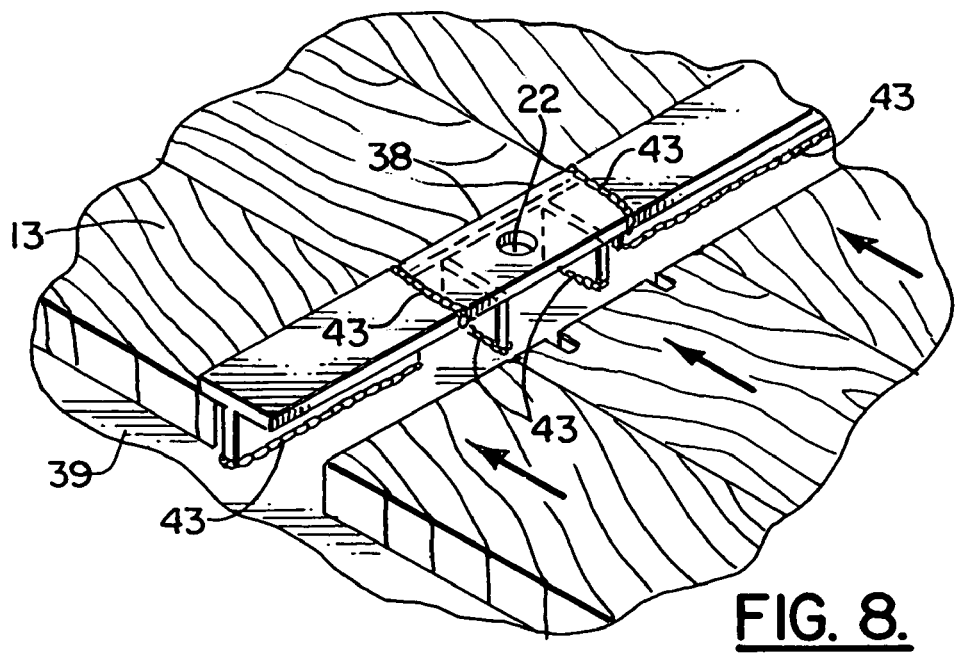
FIG. 8 is a partial perspective view of the preferred embodiment of the apparatus of the present invention showing insertion of a new section having a socket for one of the beams attached to the vehicle load platform upper surface.
Figure 9:
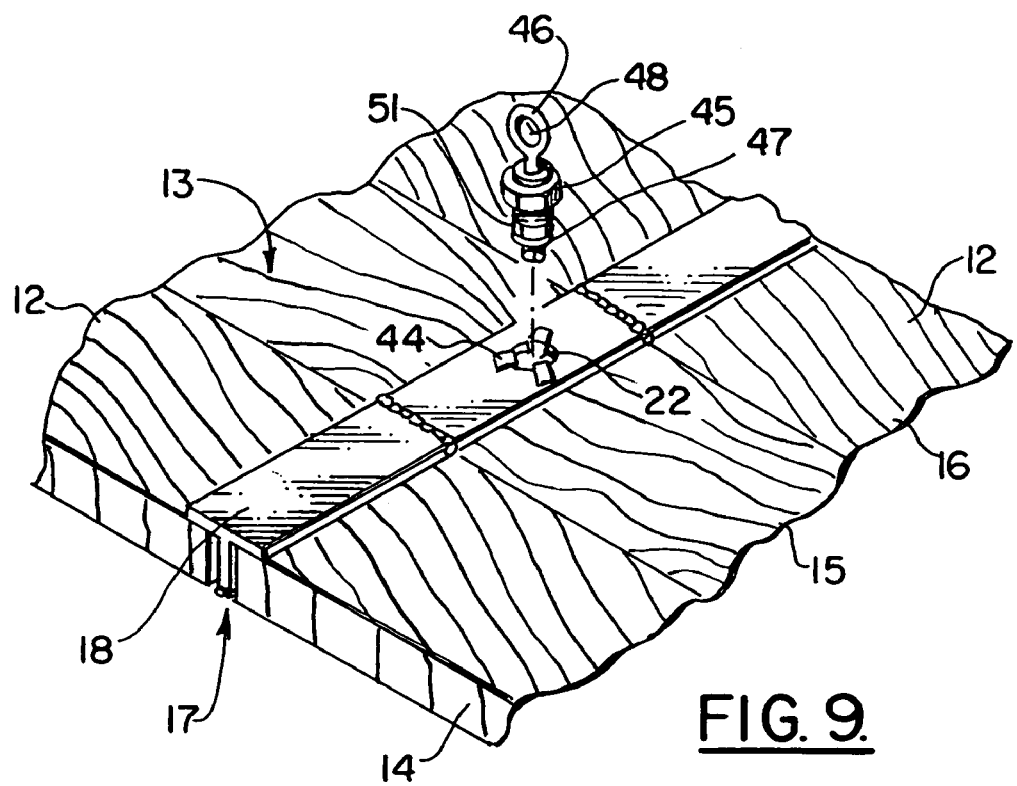
FIG. 9 is a partial perspective view of the preferred embodiment of the apparatus of the present invention illustrating attachment of a tie down anchor to the vehicle load platform.
Figure 10:
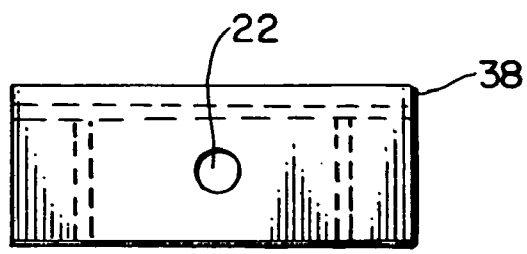
FIGS. 10, 11 and 12 are top, side and end views respectively of the new section of beam added in FIGS. 7 and 8.
Figure 11:
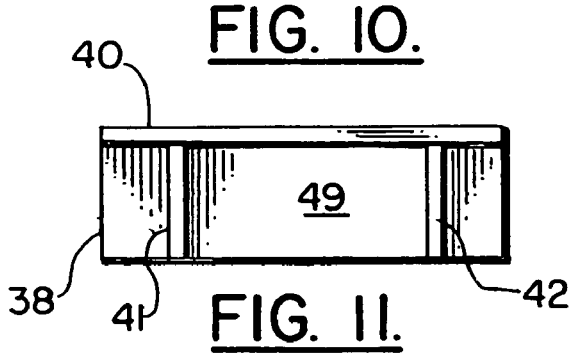
Figure 12:
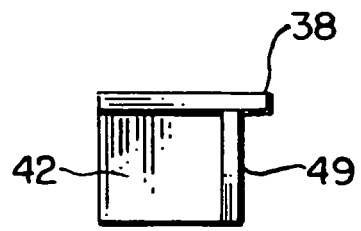

For vehicles 11 already having a vehicle platform 12 provided with beams such as beam 18A, the existing beam 18A can be modified by replacing a section of the beam 18*a* with a new section 38. In FIG. 6, the removed section 37 is shown. In FIGS. 8 and 9, the new section 38 is shown having been welded into the position that was vacated by the removed section 37. The weld beads 43 are shown in FIG. 8 for joining the new section 38 to the existing beam 18A, thus forming a new beam 18.

Each beam 18, 19, 20, 21 provides a socket or opening 22 that is receptive of a specially configured bolt 45. The new section 38 provides reinforcing that surrounds the socket 22, namely upper plate 40, flanges 41, 42, and plate 49. An insert 44 that is specially configured is placed in an opening formed in plate 40, the insert 44 and opening defining socket 22.

Bolt 45 is a specially configured bolt that is shown and described in prior U.S. patent application Ser. No. 10/071,786 filed Feb. 7, 2002, hereby incorporated herein by reference.

Bolt 45 provides proximal end 46 and a distal end 47. An eyelet 48 can be provided in proximal end 46. After insertion of bolt 45 into socket 22, the proximal 46 portion (for example eyelet 48) is rotated. Socket 22 can be provided with a reinforcing insert 44. This rotation causes a plurality of extendable members 51 to move from a retracted position that enables the bolt 45 to be inserted into the socket 22 to an expanded position that prevents the bolt 45 from being removed from the socket 22. In FIG. 1, a plurality of beams 18, 19 and 20, 21 are shown that are positioned in a rectangular fashion and surrounding load 50 to be secured. A plurality of tie down straps include cables 23 and cushions 24. The cushions 24 are surrounded by a cylindrical outer wall 25. The cushions 24 include a foam core 36. A radial slot 27 communicates between bore 26 and cylindrical outer wall 25. As shown in FIGS. 3 and 4, this slot 27 enables each cushion 24 to be mounted upon a selected length of cable by spreading the slot 27 as indicated by arrow 33 in FIG. 3.

Once mounted upon a section of cable 23, a plurality of straps 29 can be used for securing each cushion 24 to the cable 23. Each strap 29 provides fastener material 30. Correspondingly positioned fastener material 31 on cylindrical outer wall 25 enables a connection to be made between each strap 29 and cylindrical outer wall 25. This fastener material 30, 31 can be for example hook and loop material (for example Velcro). Arrows 34 illustrate the connection of straps 29 to cylindrical outer wall 25 of cushion 24. Cushion 24 provides surface 32 that can be of a selected color and/or pattern (e.g. stripes, cross hatch, etc.). Similarly, strap 29 provides a surface 28 that can be colored and/or patterned as well. The surfaces 28, 32 can be color coded and thus used to identify the contents of package or load 50.

The following is a list of parts and materials suitable for use in the present invention.

| Part Number | Description |
|---|---|
| | PARTS LIST |
| 10 | vehicle cargo transport system |
| 11 | vehicle |
| 12 | vehicle platform |
| 13 | upper surface |
| 14 | wooden member |
| 15 | wooden member |
| 16 | wooden member |
| 17 | groove |
| 18 | front transverse beam |
| 18A | existing beam |
| 19 | rear transverse beam |
| 20 | first longitudinal beam |
| 21 | second longitudinal beam |
| 22 | socket |
| 23 | cable |
| 24 | cushion |
| 25 | cylindrical outer wall |
| 26 | central bore |
| 27 | radial slot |
| 28 | surface |
| 29 | strap |
| 30 | fastener material |
| 31 | fastener material |
| 32 | surface |
| 33 | arrow |
| 34 | arrow |
| 35 | arrow |
| 36 | foam core |
| 37 | removed section |
| 38 | new section |
| 39 | underdeck |
| 40 | plate |
| 41 | flange |
| 42 | flange |
| 43 | weld bead |
| 44 | insert |
| 45 | bolt |
| 46 | proximal end |
| 47 | destal end |
| 48 | eyelet |
| 49 | plate |
| 50 | package |
| 51 | extendable members |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims:

The invention claimed is:

1. A vehicle cargo transport apparatus for carrying and securing a load comprising:
   a) a vehicle having a load platform with an upper surface;
   b) first and second pluralities of beams affixed to the load platform at the upper surface, the first pair of said beams forming an angle with the second plurality of said beams, each beam having at least one beam opening;
   c) a plurality of tie down anchors selectively attachable to spaced apart positions on the beams at the beam openings, the anchors enabling multiple load tie down cables to be selectively attached to the beams at the tie down anchors when securing the load;
   d) a plurality of tie down cables for securing the load to the load platform, each tie down cable extending between a tie down anchor on one said beam opening and another tie down anchor on another said beam opening; and
   e) each of the tie down anchors being provided with a proximal portion and an expandable distal portion that enables an interlock connection to be made with one said beam at one said beam opening when the proximal portion of the anchor is rotated.

2. The vehicle cargo transport apparatus of claim 1 wherein each tie down anchor proximal portion includes an eyelet.

3. The vehicle cargo transport apparatus of claim 1 wherein the expandable portion includes a plurality of separate members that move between retracted and expanded positions.

4. The vehicle cargo transport apparatus of claim 1 wherein the vehicle is a marine vessel.

5. The vehicle cargo transport apparatus of claim 1 wherein the vehicle is a truck.

6. The vehicle cargo transport apparatus of claim 1 wherein the vehicle is an aircraft.

7. The vehicle cargo transport apparatus of claim 1 wherein the vehicle is a rail car.

8. The vehicle cargo transport apparatus of claim 1 wherein said first pair of beams are generally parallel.

9. The vehicle cargo transport apparatus of claim 1 wherein said second pair of beams are generally parallel.

10. The vehicle cargo transport apparatus of claim 1 wherein a beam of the first pair of beams is perpendicular to a beam of the second pair of beams.

11. The vehicle cargo transport apparatus of claim 1 wherein the cables each include a cable and a foam sleeve attached to the cable.

12. The vehicle cargo transport apparatus of claim 11 further comprising a cylindrically shaped wall surrounding the foam sleeve.

13. A vehicle cargo transport apparatus for carrying and securing a load comprising:
   a) a vehicle having a load platform with an upper surface;
   b) first and second pluralities of beams affixed to the load platform at the upper surface, the first pair of said beams forming an angle with the second plurality of said beams;
   c) a plurality of tie down anchors selectively attachable to spaced apart sockets at different locations to the pairs of beams, the anchors enabling multiple load tie downs to be selectively attached to the beams at the tie down anchors when securing the load;
   d) a plurality of tie down straps for securing the load to the load platform, each tie down strap extending between a tie down anchor on one said beam and another tie down anchor on another said beam;
   e) the tie down anchors being provided with a proximal portion and an expandable distal portion that interlocks with the socket when the proximal portion of the anchor is rotated.

14. The vehicle cargo transport apparatus of claim 13 wherein each tie down anchor proximal portion includes an eyelet.

15. The vehicle cargo transport apparatus of claim 13 wherein the expandable portion includes a plurality of separate members that move between retracted and expanded positions.

16. The vehicle cargo transport apparatus of claim 13 wherein the vehicle is a marine vessel.

17. The vehicle cargo transport apparatus of claim 13 wherein the vehicle is a truck.

18. The vehicle cargo transport apparatus of claim 13 wherein the vehicle is an aircraft.

19. The vehicle cargo transport apparatus of claim 13 wherein the vehicle is a rail car.

20. The vehicle cargo transport apparatus of claim 13 wherein said first pair of beams are generally parallel.

21. The vehicle cargo transport apparatus of claim 13 wherein said second pair of beams are generally parallel.

22. The vehicle cargo transport apparatus of claim 13 wherein a beam of the first pair of beams is perpendicular to a beam of the second pair of beams.

23. The vehicle cargo transport apparatus of claim 13 wherein the tie downs each include a strap and a foam sleeve attached to the strap.

24. The vehicle cargo transport apparatus of claim 13 further comprising a cylindrically shaped wall surrounding the foam sleeve.

* * * * *